United States Patent
Duffy

[15] 3,678,580
[45] July 25, 1972

[54] SCROLL SHEARS OR THE LIKE
[72] Inventor: William Duffy, Jamesburg, N.J.
[73] Assignee: J. Wiss and Sons Co., Newark, N.J.
[22] Filed: Sept. 21, 1970
[21] Appl. No.: 74,087

[52] U.S. Cl. ...................................................... 30/267
[51] Int. Cl. ................................................... B26b 13/28
[58] Field of Search .................... 30/252, 257, 259, 266, 267

[56] References Cited

UNITED STATES PATENTS

| | | | |
|---|---|---|---|
| 642,345 | 1/1900 | Loffi | 30/266 |
| 1,594,671 | 8/1926 | Isaac | 30/257 |
| 3,143,799 | 8/1964 | Gover | 30/259 |

FOREIGN PATENTS OR APPLICATIONS

| | | | |
|---|---|---|---|
| 64,977 | 11/1892 | Germany | 30/266 |

Primary Examiner—Theron E. Condon
Assistant Examiner—J. C. Peters
Attorney—Sparrow and Sparrow

[57] ABSTRACT

Scroll shears or snips with an offset cutting edge with relation to the flank of the shear, in order to obtain clearance to scroll slightly to the right, while retaining full maneuverability to the left. An adjustable ride or hardened washer interposed between the cutting blades of the shears to facilitate adjustment of clearance after grinding.

10 Claims, 8 Drawing Figures

PATENTED JUL 25 1972 3,678,580
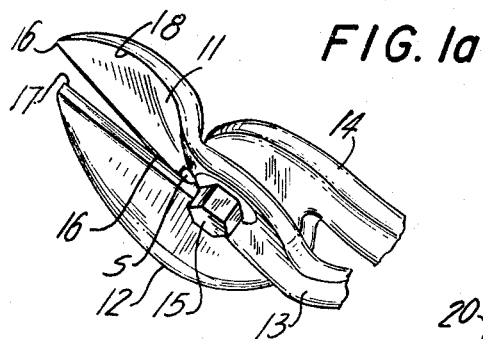
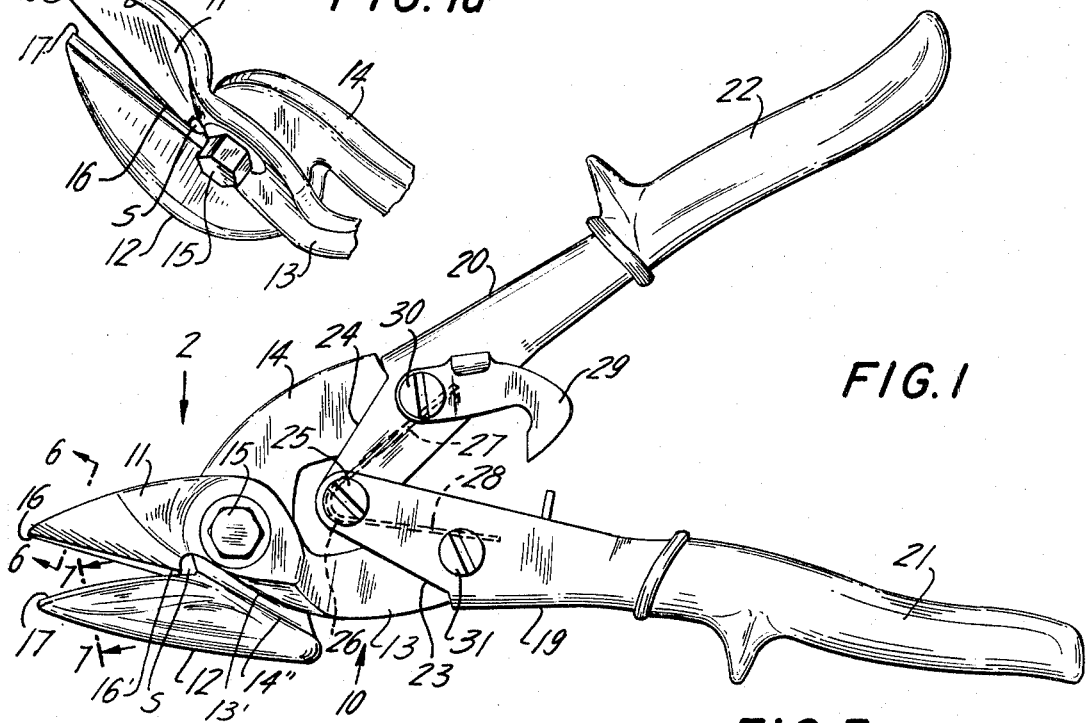
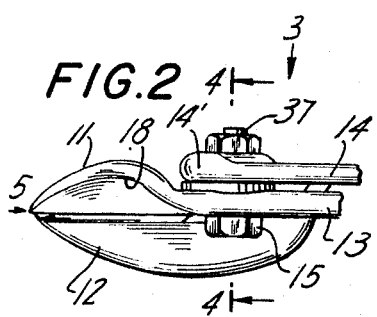
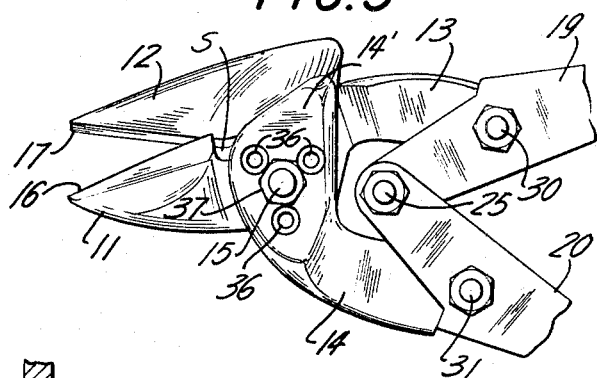
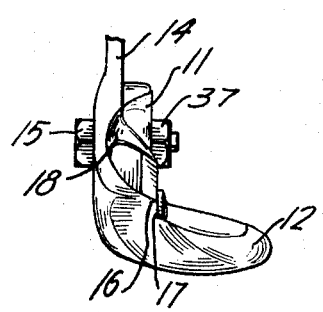
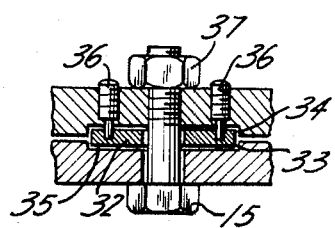
INVENTOR
WILLIAM DUFFY
BY
SPARROW AND SPARROW
ATTORNEYS

SCROLL SHEARS OR THE LIKE

BACKGROUND OF THE INVENTION

The present invention relates in general to shear-type cutting tools and particularly to such tools as are used for cutting metals, plastics and combinations in sheet form.

Scroll shears for cutting sheet metal or like sheet material are well known in the trade. They permit unlimited maneuverability in one direction, so that the operator may cut a square corner, a very small curve, or even cycloidal and involute shapes. However, these scroll shears have one serious disadvantage. If shears were made to make a scroll to the left (normal for use by a right-handed person) they would not scroll to the right; thus it was almost impossible to regain a given cutting line when the operator went even slightly off to the left. The reverse was true when the shears had been made for cutting to the right, so that it had been impossible to return to the cutting line when an error had been made by veering a bit too much to the right. Improvements have been made in the past by forging a throat in the flank of the shears, such as disclosed in U.S. Pat. No. 3,143,799. Another disadvantage found in all existing scroll shears is that some metal has to be removed from the ride area when the blades are resharpened by grinding, in order to bring the blades back into a proper cutting relationship. This is a very difficult, and in many instances unsuccessful, operation.

A solution to these problems has been found by this invention.

SUMMARY

The invention consists in such novel features, construction arrangements, combinations of parts and improvements as may be shown and described in connection with the article therein disclosed by way of example only and as illustrative of a preferred embodiment.

The novel way to overcome the difficulties and disadvantages of the past art, which is the gist of this invention, is to provide an offset cutting edge, relative to the flank of the shears, in order to obtain clearance to scroll slightly to the right while retaining full maneuverability to the left. Resharpening of worn edges further requires a resetting of the blades in the direction of increasing the spacing of the ride. The invention provides new and very simple adjusting means for the ride compensation.

Objects and advantages of the invention will be set forth in part hereafter and in part will be obvious herefrom or may be learned by practicing the invention, the same being realized and attained by means of the instrumentalities and combinations pointed out in the appended claims.

It is an object of the invention to provide scroll shears with an offset cutting edge in relation to the flank of the shears in order to obtain clearance to scroll slightly to the right while retaining full maneuverability to the left.

A further object of the invention is to provide an adjustable ride in scroll shears for permitting adjustments of cutting blade clearance.

Another object of the invention is to provide cutting blade clearance adjustment means which are easily and conveniently operated.

BRIEF DESCRIPTION OF THE DRAWING

In the following description and in the claims, parts will be identified by specific names for convenience, but such names are intended to be as generic in their application to similar parts as the art will permit. Like reference characters denote like parts in the several figures of the drawing, in which FIG. 1 shows a side elevation of the scroll shears in an open position;

FIG. 1a is a perspective view of the front portion of the shears, with its bottom up;

FIG. 2 is a top view of the scroll shears, partly broken away, shown in FIG. 1, taken in the direction of the arrow 2;

FIG. 3 is a bottom view of the scroll shears, partly broken away, shown in FIG. 1, taken in the direction of the arrow 3 in FIG. 2, partly broken away;

FIG. 4 is a cross-section of the scroll shears shown in FIG. 1, taken along the line 4—4 in FIG. 2, partly broken away;

FIG. 5 is a view of the scroll shears, taken in the direction of the arrow 5 in FIG. 2, partly broken away;

FIG. 6 is a cross-section of the upper blade of the scroll shears, taken along the line 6—6 in FIG. 1, partly broken off;

FIG. 7 is a cross-section of the lower blade of the scroll shears, taken along the line 7—7 in FIG. 1, partly broken off.

DESCRIPTION OF THE PREFERRED EMBODIMENT

Referring now in more detail to the drawing illustrating a preferred embodiment by which the invention may be realized, there is in FIG. 1 a side elevation of the scroll shears 10 with an upper cutting blade 11 and a lower cutting blade 12. Blades 11 and 12 have shanks 13 and 14, respectively and are pivotally mounted on a pivotal bolt 15 (FIG. 4). Blades 11 and 12 have cutting edges 16 and 17, respectively. Lower blade 12 is offset forwardly of flank portion 14' of shank 14 and extends to the front of upper blade 11. Where blade 12 connects at its rear with flank portion 14' it slopes downwardly as seen at 14''. The cutting edge 17 of blade 12 extends inwardly of the juncture line of blade 12 and flank portion 14'. In other words, the cutting edge 17 of blade 12 is not in alignment with said juncture line, but is offset in relation thereto. Considering the left-hand scroll shears shown in FIG. 1, shank 14 from which flank 14' extends downwardly, is pivoted behind shank 13 and protrudes angularly below pivot 15 to the left extending then forwardly to provide blade 12 with its cutting edge 17. Upper blade 11 is curved away from cutting edge 16 (shown at 18 in FIGS. 2 and 5) in order to provide sufficient maneuverability to the right while retaining capacity for full operational movement to the left. The cutting edge 16 of blade 11 is so disposed on the pivoted shank 13 that the cutting edge 16 meets the cutting edge 17 of blade 12 in a straight cutting line (FIG. 2). A relief between the lower edge 13' of shank 13 and the starting edge 16' constitutes a cutout forming an open space S providing a clearance at the rear ends of the two cutting edges 16 and 17. Shanks 13, 14 are attached to the handles 19 and 20, respectively, which have hand grips 21 and 22, respectively, covered with suitable plastic. Handles 19, 20 are extended beyond their point of attachment to shanks 13, 14 in the direction toward pivot point 15, and their forward ends 23, 24 are pivotally joined by a bolt 25. A spring 26 is wound around bolt 25, and the free ends 27, 28 of spring 26 are disposed to abut against the inside of shanks 13, 14 in order to urge shears 10 to open, thus providing a return stroke during cutting operations. A latch 29 is swingably attached to the screw 30 fastening shank 13 to handle 19, whereas the screw 31 fastening shank 14 to handle 20 serves as a catch for latch 29.

A ride between blades 11, 12 is provided (FIG. 4) consisting of a washer 32 which is located in recesses 33, 34 of blades 11, 12, respectively. Washer 32 preferably consists of hardened steel and is preferably coated with a layer 35 of a material having a low coefficient of friction such as "Teflon S." Three pointed set screws, commonly called half dog point set screws 36 are equally spaced around pivotal bolt 15 and are directly threaded in lower blade 12 (FIGS. 3 and 4). Set screws 36 abut with their dog points against washer 32. It is easily and conveniently possible to adjust the clearance between blades 11, 12 by means of set screws 36. This facility of adjustment of blades 11, 12 after regrinding the cutting edges 16, 17 thereof has the further advantage of quick adjustment for cutting very thin material. When cutting an average sheet metal of 0.020 to 0.036 inch thickness, a clearance of approximately 0.008 inch between cutting edges 16 and 17 should be kept. However, when cutting very thin materials of 0.002 to 0.012 inch thickness, the clearance between cutting edges 16 and 17 must be reduced to zero, because otherwise the thin metal is pulled between the blades and is squeezed, chewed or is otherwise improperly cut. Conversely, when cutting very heavy materials of 0.040 to 0.062 inch, a spacing or clearance of approximately 0.012 inch between the cutting edges has been found desirable. By the use of the novel ride compensating adjustment, according to the present invention, settings suitable for the work to be done can be easily and quickly obtained, as well as resetting after sharpening of the blades.

While the invention has been described and illustrated with respect to a certain preferred example which gives satisfactory results, it will be understood by those skilled in the art after understanding the principle of the invention, that various other changes and modifications may be made without departing from the spirit of the invention.

I claim:

1. Shears having an upper cutting blade and a lower cutting blade and a pivotal bolt, said blades being rotatably disposed on said bolt, said blades having cutting edges forming a cutting line, said cutting line being offset relative to said blades; and a ride between said blades disposed to provide cutting clearance between said cutting edges, said blades having recesses, said ride inserted in said recesses, said ride concentrically circumposed around said pivotal bolt, and a plurality of set screws threadably disposed in one of said blades equally spaced around said bolt, said set screws abutting against said ride whereby said cutting clearance between said cutting edges may be adjusted.

2. Shears according to claim 1, said upper blade having a curved shape curving away from said cutting line.

3. Shears according to claim 1, and wherein said ride is a washer having an antifriction coating thereon.

4. In shears having an upper cutting blade and a lower cutting blade and a pivotal bolt, said blade having cutting edges and being rotatably disposed on said bolt; a ride between said blades disposed to provide cutting clearance between said cutting edges, said blades having recesses, said ride inserted in said recesses, said ride concentrically circumposed around said pivotal bolt, a plurality of set screws threadably disposed in one of said blades equally spaced around said bolt, said set screws abutting against said ride whereby said cutting clearance between said cutting edges may be adjusted.

5. In shears according to claim 4 wherein said ride is a washer having an antifriction coating thereon.

6. Shears having an upper cutting blade and a lower cutting blade and a pivotal bolt, said blades being rotatably disposed on said bolt, said blades having cutting edges forming a cutting line, said cutting line being offset relative to said blades; and a ride between said blades disposed to provide cutting clearance between said cutting edges, at least one of said blades having a recess, said ride extending within said recess; said ride concentrically circumposed around said pivotal bolt, and a plurality of set screws threadably disposed in one of said blades substantially equally spaced around said bolt, said set screws abutting against said ride whereby said cutting clearance between said cutting edges may be adjusted.

7. Shears according to claim 6, said upper blade having a curved shape curving away from said cutting line.

8. Shears according to claim 7, and wherein said ride is a washer having an antifriction coating thereon.

9. In shears having an upper cutting blade and a lower cutting blade and a pivotal bolt, said blades having cutting edges and being rotatably disposed on said bolt; a ride between said blades disposed to provide cutting clearance between said cutting edges, at least one of said blades having a recess, said ride extending within said recess, said ride concentrically circumposed around said pivotal bolt, a plurality of set screws threadedly disposed on one of said blades substantially equally spaced around said bolt, said set screws abutting against said ride whereby said cutting clearance between said cutting edges may be adjusted.

10. In shears according to claim 9, wherein said ride is a washer having an antifriction coating thereon.

* * * * *